United States Patent [19]

Gurevich et al.

[11] 3,849,211

[45] Nov. 19, 1974

[54] FLUX FOR WELDING REFRACTORY AND NON-FERROUS METALS

[76] Inventors: Samuil Mordkovich Gurevich, bulvar Lesi Ukrainki, 2, kv. 2; Vadim Nikolaevich Zamkov, bulvar Lesi Ukrainki, 2, kv. 8; Valery Pavlovich Prilutsky, ulitsa N. Botanicheskaya, 15/17, kv. 4; Vladimir Filippovich Topolsky, ulitsa Kioto, 9, kv. 89; Nikolai Vasilievich Podkopai, ulitsa Stanislavskogo, 3, kv. 4; Sergei Afanasievich Manoilo, ulitsa Demyana Bednogo, 12, kv. 33; Nikolai Leonidovich Dykhno, ulitsa Melnikova, 48, kv. 6, all of Kiev, U.S.S.R.

[22] Filed: June 13, 1973

[21] Appl. No.: 369,763

[52] U.S. Cl. .................................. 148/26, 75/94
[51] Int. Cl. ...................... B23k 35/34, C22b 9/10
[58] Field of Search ........................... 148/26; 75/94

[56] References Cited
UNITED STATES PATENTS

| | | | |
|---|---|---|---|
| 2,507,751 | 5/1950 | Bennett | 148/26 |
| 2,849,308 | 8/1958 | Foote | 75/94 |
| 3,269,828 | 8/1966 | Hale | 75/94 |
| 3,551,218 | 12/1970 | Gurevich | 148/26 |

FOREIGN PATENTS OR APPLICATIONS

| | | | |
|---|---|---|---|
| 309,060 | 3/1970 | U.S.S.R. | 75/94 |

*Primary Examiner*—Winston A. Douglas
*Assistant Examiner*—Mark Bell
*Attorney, Agent, or Firm*—Waters, Roditi, Schwartz & Nissen

[57] ABSTRACT

A flux for melting refractory and non-ferrous metals, preferably titanium and alloys thereof, which contains, percent by weight:
 barium fluoride - 3–7
 calcium fluoride - 83–92
 aluminium fluoride - 5–10.

2 Claims, No Drawings

FLUX FOR WELDING REFRACTORY AND NON-FERROUS METALS

The present invention relates to fluxes for welding refractory and non-ferrous metals and more particularly for titanium and alloys thereof in an atmosphere of protective gases.

A flux is known containing, percent by weight: calcium fluoride - 58–66 and aluminium fluoride - 34–42 (cf. the USSR Inventor's Certificate No. 348314).

This known flux is employed for welding titanium and alloys thereof.

However, its use involves formation of slag strongly linked to the metal welded. Removal of this slag from the surface of the welded joint is a labour-consuming operation which requires an appropriate tool.

Besides the melting of the joint weld is non-uniform in width and depth.

To reduce these defects either the welding rate is decreased or the welding current is increased. Decrease in welding rate leads to productivity decrease, and when the welding current is increased, the temperature in the joint weld zone rises which results in the warping of the metal welded.

Preparation of the surface of the edges to be welded also presents substantional difficulties. To prepare the edges a thorough mechanical working of said edges is required which takes additional time.

The increase in the volume of welding works necessitates a rise of welding rates and a reduction in the time required for preparation works and the subsequent cleaning of the welded joint from lag.

It is an object of the present invention to provide a flux for welding refractory and non-ferrous metals which ensures a welding rate rise.

It is another object of this invention to provide a flux which ensures a reduction of residual welding deformation (warping).

A further object of this invention is to reduce the welding current.

Still another object of the present invention is to attain a smaller joint weld and reduce the zone of heat influence.

Another object of the present invention is to provide a flux from which the slag film could be easily separated and to make less labour-consuming the preparation of the surface of the edges to be welded.

These and other objects have been accomplished by providing a flux containing calcium and aluminium fluorides for welding refractory and non-ferrous metals, into which flux, according to the invention, barium fluoride is introduced in an amount of 3–7 wt. percent, said calcium and aluminium fluorides being taken respectively in per cent by weight: 83–92 and 5–10.

The use of this flux makes it possible to increase labour productivity due to the welding rate rise, raise the precision of welded constructions due to the reduction of residual welding deformations, produce a tight joint weld free of defects and equal in strength to the metal being welded.

It is advisable for the ratio of barium fluoride to aluminium fluoride in the present flux be respectively in the range of 0.6 – 1.4, such ratio ensuring stability of melting in the welding of articles 0.8–3.5 mm thick.

The following examples of flux compositions are given by way of illustration.

Example 1

To weld low-alloy titanium alloys 0.8–1 mm thick, it is advisable to use a flux of the following composition, percent by weight:
 calcium fluoride - 88
 aluminium fluoride - 5
 barium fluoride - 7,
the ratio of the content of barium fluoride to aluminium fluoride being 1.4.

Example 2

In welding low-alloy titanium alloys 2–3 mm thick, a flux of the following composition may be employed, percent by weight:
 calcium fluoride - 92
 aluminium fluoride - 5
 barium fluoride - 3,
the ratio of the content of barium fluoride to aluminium fluoride being 0.6.

Example 3

In welding medium-alloy titanium alloys 3–3.5 mm thick, a flux of the following composition may be employed, percent by weight:
 calcium fluoride - 83
 aluminium fluoride - 10
 barium fluoride - 7,
the ratio of the content of barium fluoride to aluminium fluoride being 0.7.

The tests conducted indicated that when low-alloy titanium alloys 1 mm thick are welded, the welding rate increases 1.5–2 times as compared to that in welding with the use of a conventional flux. The remaining slag is easily removed from the surface of the welded joint with a steel brush while the conventional flux is removed upon thorough cleaning with a special tool.

The flux described may be also used in welding refractory metals (molybdenum, niobium) and non-ferrous metals, e.g., copper.

What is claimed is:

1. A flux for melting refractory and non-ferrous metals, which contains, percent by weight:
 barium fluoride - 3–7
 calcium fluoride - 83–92
 aluminium fluoride - 5–10

2. A flux as claimed in claim 1, wherein the ratio of barium fluoride to aluminium fluoride is in the range of 0.6 – 1.4, respectively.

* * * * *